United States Patent [19]

Harandi

[11] Patent Number: 5,461,178
[45] Date of Patent: Oct. 24, 1995

[54] CATALYTIC STRIPPING OF HYDROCARBON LIQUID

[75] Inventor: Mohsen N. Harandi, Langhorne, Pa.

[73] Assignee: Mobil Oil Corporation, Fairfax, Va.

[21] Appl. No.: 234,792

[22] Filed: Apr. 28, 1994

[51] Int. Cl.$^6$ ............................... C07C 5/03; C07C 7/10
[52] U.S. Cl. ..................... 585/259; 585/261; 585/841
[58] Field of Search ................................. 585/259, 261, 585/841

[56] References Cited

U.S. PATENT DOCUMENTS

| 5,073,236 | 12/1991 | Gelbein et al. | 203/29 |
| 5,118,872 | 6/1992 | Smith, Jr. et al. | 568/697 |
| 5,321,163 | 6/1994 | Hickey et al. | 568/59 |

Primary Examiner—Sharon A. Gibson
Assistant Examiner—Nhat D. Phan
Attorney, Agent, or Firm—Alexander J. McKillop; Malcolm D. Keen; Clinton H. Hallman, Jr.

[57] ABSTRACT

A method and operating technique for treating diene-containing aliphatic streams by introducing the light hydrocarbon stream at a top portion of a vertical stripping tower having an upper catalytic contact zone containing a bed of solid hydrogenation catalyst particles and a lower contact zone, and introducing a light gas stream containing hydrogen at a lower portion of said stripping tower. Selective hydrogenation is effected by flowing the light hydrocarbon stream and light gas stream countercurrently in contact with the solid hydrogenation catalyst particles under hydrogenation and stripping conditions, thereby converting said diene to mono-alkene in the upper contact zone.

13 Claims, 1 Drawing Sheet

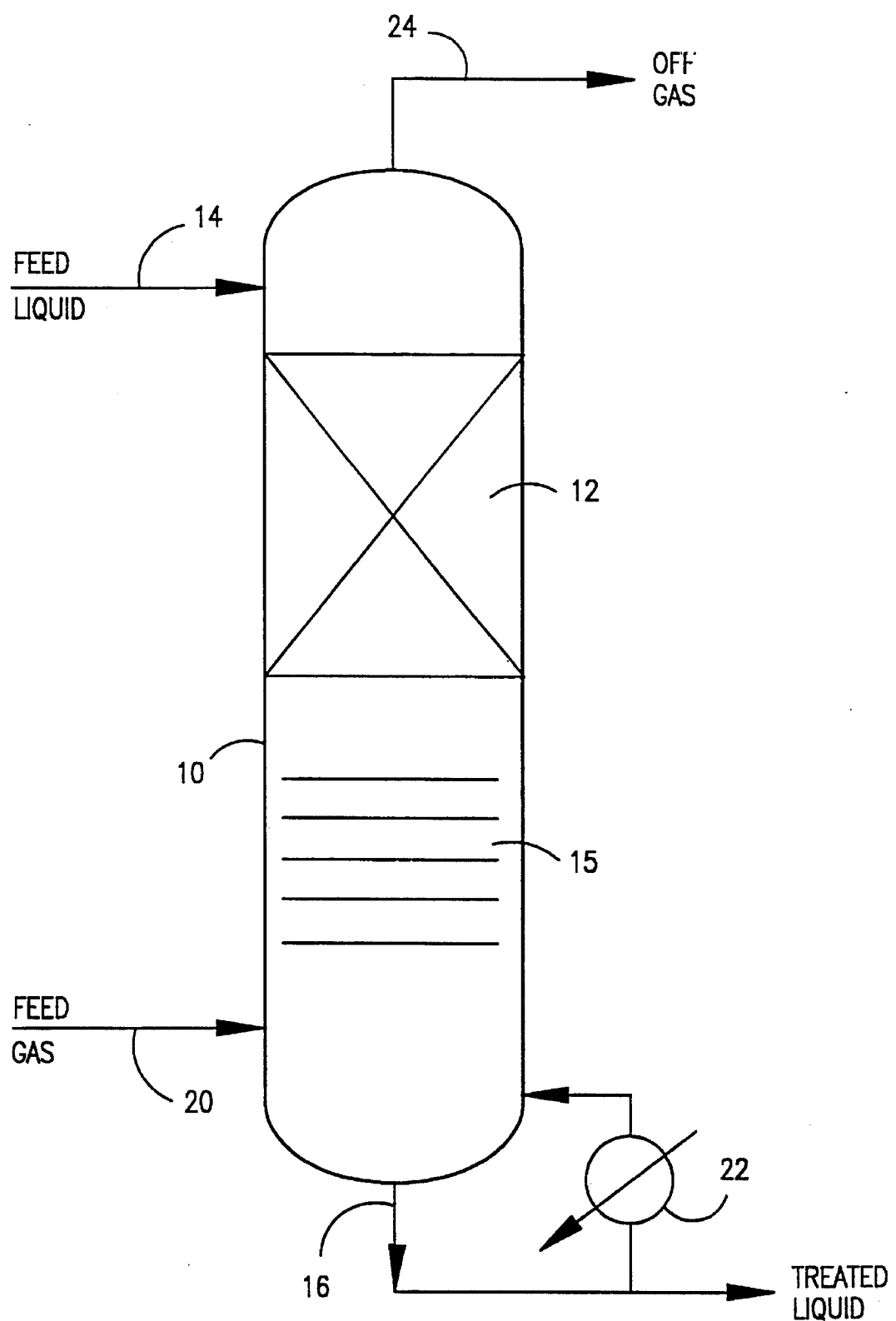

CATALYTIC STRIPPING OF HYDROCARBON LIQUID

BACKGROUND OF THE INVENTION

This invention relates to treatment of volatile olefinic hydrocarbon streams to convert dienes to mono-olefins and strip lower molecular weight components. In particular it relates to simultaneous stripping and catalytic hydrogenation of $C_3$–$C_5$ aliphatics to provide a treated light liquid useful for alkylation, etherification or other downstream processes.

Prior processes have required a separate selective hydrogenation step to remove reactive dienes. Volatile feedstreams also contain lower alkanes and alkenes, such as ethene, ethane, methane, and impurities which are removed in a separate stripping tower.

It has been discovered that catalytic hydrogenation and stripping may be conducted simultaneously in a multi-zone contact tower.

SUMMARY OF THE INVENTION

An improved process has been found for hydrogenating and stripping a volatile light hydrocarbon liquid stream containing $C_3$–$C_5$ aliphatics including diene to remove lower boiling components and convert said diene to monoalkene. The improvement comprises: a) introducing the light hydrocarbon stream at a top portion of a vertical stripping tower having an upper contact zone containing a bed of solid hydrogenation catalyst particles and a lower contact zone; b) introducing a light gas stream containing hydrogen at a lower portion of said stripping tower; c) flowing the light hydrocarbon stream and light gas stream countercurrently in contact with said solid hydrogenation catalyst particles under hydrogenation and stripping conditions, thereby converting said diene to mono-alkene in the upper contact zone; d) recovering a stripped liquid hydrocarbon stream from the bottom of said stripping tower; and e) recovering a light stripping gas stream from the top of the tower.

In the preferred embodiments the hydrogenation catalyst comprises a noble metal on an inert solid substrate, such as palladium or platinum on alumina. The process is particularly useful for treating light hydrocarbon streams containing propene, butenes, butadiene, pentenes and/or pentadiene. Typically, the feedstream liquid comprises FCC crackate or light coker liquid, which contains a $C_2$ volatile component, such as ethene, which is removed from $C_3+$ liquid components.

The upper contact zone is advantageously maintained at a temperature of 30° C. to 180° C. and total tower pressure of 300 to 3000 kPa.

DESCRIPTION OF THE DRAWING

FIG. 1 of the drawing is a schematic process flowsheet depicting the present invention.

DETAILED DESCRIPTION OF THE INVENTION

Countercurrent processes for contacting reactant fluids have several advantages. In a single point gas entry system, as the reactant gas rises upwardly from its point of introduction at the bottom of a vertical reactor below the porous bed, it contacts a lower concentration of reactive liquid components. At the point of entry the reactant gas has its greatest concentration. Depletion of the gaseous reactant upwardly will increase the relative concentration of inerts and/or byproduct vapors. Likewise, the liquid being treated is generally more reactive at the upper end of the reactor system where it contacts the depleted rising gaseous phase. Thus, the reactant concentration gradients for countercurrent two-phase systems are opposing. In a typical multi-phase reactor system, the average gas-liquid volume ratio in the catalyst zone is about 1:4 to 4:1 under process conditions.

In those reactions wherein the volume of gas decreases due to reactant depletion, the volumetric ratio or liquid to gas can increase markedly as the liquid feedstock gravitates downwardly through the reactor. In general, the quantity of unreacted gas at any particular level should be adequate to provide a mixed phase bulk density of at least 20% of the bulk density of the liquid phase (at reaction conditions).

Advantageously, the multi-phase reactor system is operated to achieve uniform distribution. If too little liquid flux is maintained, the catalyst surface in the porous bed will be coated with a liquid film; however, this trickle mode will permit excessive channeling of the gas phase instead of the desired dispersion characteristics of a reactant froth. Flow rates for both reactant phases are controlled within constraints.

In order to maintain a desirable uniform flow of reactant streams through the fixed catalyst bed, adequate flow paths for liquid and gaseous phases must be provided. In a continuous process the ratio of reactant gas to liquid feedstock and the space velocity of reactants relative to catalyst must be carefully considered. Achievement of uniform vertical flow through a porous bed of solids can be obtained if the catalyst is properly distributed and shaped. The void volume in a reaction zone is a function of catalyst configuration and loading technique. While a densely packed bed of spherical solids may be employed to place a maximum amount of catalyst in a predetermined reactor volume, the low void fraction may interfere with fluid flow, especially where countercurrent flow of two phases is required. Advantageously, the catalyst bed has a high void volume, typically greater than one half of the bed. Void fractions from 0.5 to 0.9 can be achieved using loosely packed polylobal or cylindrical extrudates. Hollow ring-type supported catalysts, such as Raschig rings or the like, permit liquids to flow downwardly through the porous bed by gravity while the gas phase reactant rises through the denser liquid, forming dispersed bubbles which contact the wetted catalyst to enhance mass transfer and catalytic phenomena.

Catalyst size can vary widely within the inventive concept, depending upon process conditions and reactor structure. If a low space velocity or long residence in the catalytic reaction zone is permissible, small catalysts having an average maximum dimension of 1 to 5 mm may be employed. However, it is preferred to use larger sizes, e.g., 0.5–2 cm or more, especially when extrudates, beads, rings, saddles or other contact materials are desired. Relatively small catalyst particles may be loaded randomly to assure uniformity and larger supported catalysts may be stacked in a geometric pattern to achieve optimum bed utilization. Structured packing is advantageous for countercurrent two phase flow.

Reactor configuration is an important consideration in the design of a continuously operating system. In its simplest form, a vertical cylindrical pressure vessel is provided with a catalyst retaining means and operatively connected for countercurrent fluid flow. A typical vertical reactor having a catalyst bed length to effective diameter (L:D) ratio of about 1:1 to 20:1 is preferred. A single bed or a stacked series of beds may be retained within the same reactor shell. While a reactor of uniform horizontal cross section is disclosed herein, other non-uniform configurations, such as spherical reactors, tapered vessels, etc. may be employed.

Referring to FIG. 1, a countercurrent continuous catalytic reactor system is shown for treating a liquid phase with a gaseous reactant for selective catalytic hydrogenation of diene and stripping of volatile components. An enclosed de-ethanizer stripping tower or reactor shell 10 contains a fixed porous bed 12 of solid catalyst in an upper contact portion. Upper liquid inlet means 14 is provided for introducing a feed stream of liquid containing diene substantially above the porous catalyst bed for downward gravity flow through the bed toward lower contact portion 15 and liquid outlet means 16 for withdrawing treated liquid from the reactor shell. Stripping may be facilitated by passing a portion of the bottom liquid stream through reboiler heat exchanger 22. Gas inlet means 20 is disposed below the catalyst bed and lower contact portion for introducing a gaseous reactant stream containing hydrogen under pressure for countercurrently contacting downwardly flowing liquid in a mixed phase reaction zone, whereby gaseous reactant is dispersed through the liquid phase in intimate contact with the solid catalyst. The de-ethanizer stripping zone 15 may include a number of contact plates, packed column section or the like for providing necessary contact between gas and liquid phases. After passing through the stripping and reaction zones, the gas phase is recovered through upper off-gas outlet means 24, and gas containing stripped volatile components is withdrawn from the tower.

The non-catalytic fractioination section may be varied within the inventive concept by substituting positions. Although not shown in the drawing, another configuration may contain an additional fractionation section between the gaseous feed and reboiler inlet to the tower. Also, an upper fractionation section can be used above the feed stream 14 or between the liquid feed and bed 12.

Selective hydrogenation is a known catalytic process for converting dienes to corresponding monoalkenes, i.e.— butadiene to butene, and suitable catalysts are commercially available for this purpose. Palladium metal on alumina particles is a preferred; however, other hydrogenation catalysts, such as Pt, Co/Mo or selective catalysts may be employed. Other hydrogen reactions, such as hydrodesulfurization may be conducted in the reactor system.

As an example of typical feedstock and process conditions, FCC crackate containing $C_3$–$C_9$ alkenes, alkanes and dienes and $C_2$- volatile components is treated with a hydrogen-rich stripping gas such as a hydrogen-containing FCC wet gas stream containing predominantly methane, ethane, ethene and about 15–20 mol % $H_2$, in the above-described reactor tower in a solid Pd/alumina packed catalyst bed under selective hydrogenation conditions at 50° to 100° C. reaction temperature and 1500 to 2500 kPa pressure. The butadiene and pentadienes and other dienes are hydrogenated and treated liquid containing converted monoalkene product is recovered substantially free of $C_2$-volatile components.

While the invention has been described by particular example, there is no intention to limit the inventive concept except as set forth in the following claims.

I claim:

1. A process for hydrogenating and stripping a volatile light hydrocarbon liquid stream containing $C_3$–$C_5$ aliphatics including diene to remove lower boiling components and convert said diene to monoalkene, comprising the steps of:

introducing said light hydrocarbon stream at a top portion of a vertical stripping tower having an upper contact zone containing a bed of solid hydrogenation catalyst particles and a lower contact zone;

introducing a light gas stream containing hydrogen at a lower portion of said stripping tower;

flowing said light hydrocarbon stream and said light gas stream countercurrently in contact with said solid hydrogenation catalyst particles under hydrogenation and stripping conditions, thereby converting said diene to monoalkene in the upper contact zone;

recovering a stripped liquid hydrocarbon stream from the bottom of said stripping tower; and recovering a light stripping gas stream from the top of said tower.

2. The process of claim 1 wherein said hydrogenation catalyst comprises a noble metal on an inert solid substrate.

3. The process of claim 2 wherein said catalyst comprises palladium or platinum on alumina.

4. The process of claim 1 wherein said light hydrocarbon stream contains propene, butenes, butadiene, pentenes and pentadiene.

5. The process of claim 4 wherein said upper contact zone is maintained at a temperature of 30° C. to 180° C. and total tower pressure of 300 to 3,000 kPa.

6. The process of claim 4 wherein said light hydrocarbon stream contains a $C_2$ volatile component, which is removed from $C_3$+ liquid components.

7. The process of claim 1 wherein said light hydrocarbon stream comprises fluid catalytic cracker crackate or light coker liquid.

8. In the process for stripping and de-ethanizing a light fluid catalytic cracker (FCC) crackate stream containing a mixture of $C_2^-$ and $C_3^+$ alkene components and including diene components, wherein the crackate stream is stripped in a de-ethanizer tower to remove $C_2^-$ components from the crackate stream; the improvement which comprises:

contacting the crackate in liquid downflow with a countercurrent hydrogen-containing gas stream in a fixed bed of solid catalyst particles maintained in the de-ethanizer tower, wherein the catalyst particles comprise selective diene hydrogenation metal for converting diene to monoalkene.

9. The process of claim 8, wherein the hydrogenation catalyst comprises a noble metal on a solid catalyst carrier, wherein the bed of catalyst is maintained at 30° to 180° C., and wherein the crackate stream contains pentadiene.

10. The process of claim 8, wherein the deethanizer is adapted from an FCC unsaturated gas plant stripper.

11. The process of claim 8, wherein the stripping gas comprises a hydrogen-containing refinery stream.

12. The process of claim 11, wherein the stripping gas comprises FCC or coker wet gas.

13. A process for selectively hydrogenating a diene-containing light hydrocarbon stream containing a mixture of $C_2^-$ and $C_3^+$ alkene components and including at least one diene component which comprises:

contacting the diene-containing light hydrocarbon stream in liquid downflow with a countercurrent hydrogen-containing refinery wet gas stream in a fixed bed of solid catalyst particles maintained in a vertical contact tower, wherein the catalyst particles comprise selective diene hydrogenation metal for converting diene to monoalkene.

* * * * *